Jan. 24, 1961  F. JERMÁŘ  2,968,929
ARRANGEMENT FOR RAISING OR LOWERING OF HEAVY BODIES
USING THE LIFTING POWER OF FLOATERS
Filed Dec. 23, 1957  2 Sheets-Sheet 1
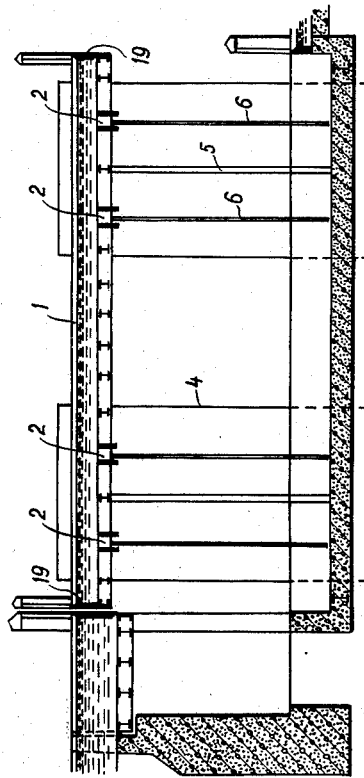
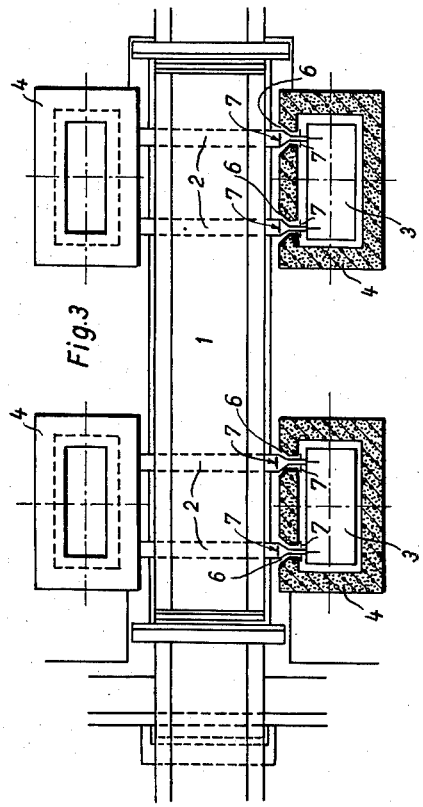
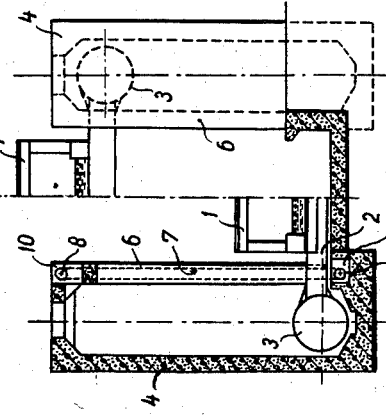
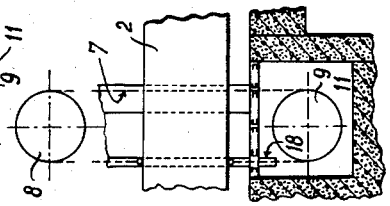
INVENTOR.
František Jermář
BY Jan. 24, 1961 F. JERMÁŘ 2,968,929
ARRANGEMENT FOR RAISING OR LOWERING OF HEAVY BODIES
USING THE LIFTING POWER OF FLOATERS
Filed Dec. 23, 1957 2 Sheets-Sheet 2

INVENTOR.
František Jermář
BY ated Jan. 24, 1961

United States Patent Office 2,968,929

2,968,929

ARRANGEMENT FOR RAISING OR LOWERING OF HEAVY BODIES USING THE LIFTING POWER OF FLOATERS

František Jermář, 6 Smetanovo Nabrezi, Prague I, Czechoslovakia

Filed Dec. 23, 1957, Ser. No. 704,554

Claims priority, application Czechoslovakia Dec. 30, 1956

6 Claims. (Cl. 61—9)

The present invention relates to elevators for ships and other heavy bodies such as panel sluice gates and the like, using floats vertically movable in chambers filled with water which floats by their buoyancy balance the weight of the raised or lowered body.

Known ship elevators employ a trough which accommodates the ship to be raised or lowered. The trough is partly filled with water and is supported by a steel structure rigidly connected with floats. According to one known design, there are two floats below the trough which are movable in a chamber filled with water. The raising or lowering of the trough is accomplished by adding water to the trough or discharging water from the trough. If the difference between the upper and lower water level is considerable, the erection of such a ship elevator becomes rather difficult and expensive, as special deep shafts have to be built for the floats which, for instance, for a difference of 80 feet between the water levels have to be about 220 feet deep.

According to another suggestion, the weight of the trough is balanced by four floats, respectively moving in two pairs of steel cylinders arranged on both sides along the trough and filled with water. The trough is suspended by means of elements stressed in tension and forming part of a rigid steel structure which is firmly connected with the floats and enters said steel cylinders from above. This rather bulky steel structure of considerable height does not blend harmoniously with the surrounding landscape.

It is an object of the present invention to provide an arrangement for raising or lowering heavy bodies such as ships, heavy sluice gates, and the like with the aid of floats moving in chambers filled with water and balancing the weight of the raised or lowered bodies, the arrangement being of reasonable height and not requiring deep excavations which are rather expensive.

Figure 6:
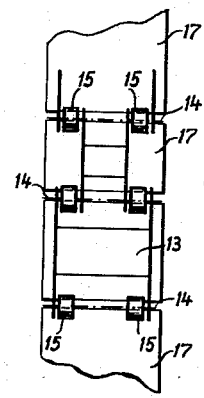
Figure 7:
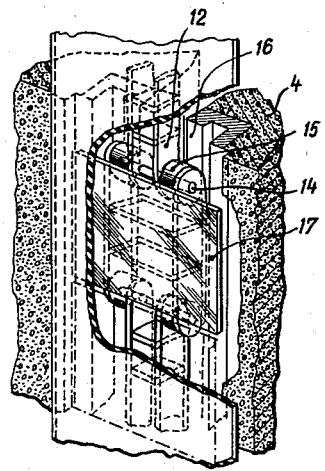
Figure 8:
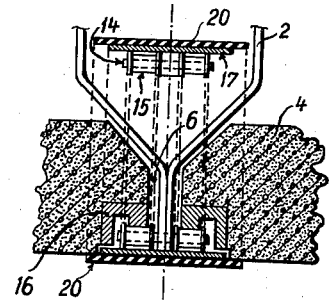
Figure 11:
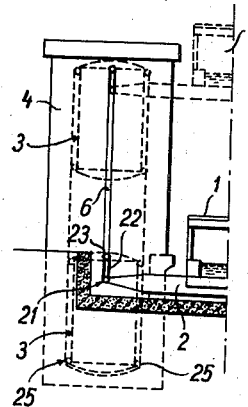
Figure 12:
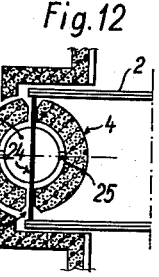
Figure 13:
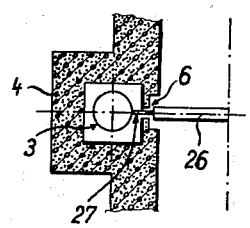

Embodiments of the invention are shown by way of example in the accompanying drawings, wherein Figs. 1, 2 and 3 respectively show a fragmentary cross section, an elevation in longitudinal section, and a top view of a ship elevator, Fig. 4 is a detailed view of guiding means for the endless chain used for sealing a longitudinal slot in a water shaft, Fig. 5 is a detailed view of the tensioning drums for the elastic sealing band, Fig. 6 shows a schematic view of elements of the link chain used for sealing the slot of the shaft, Fig. 7 is an axonomeric view of one link of the sealing chain and of its guiding means, Fig. 8 illustrates a cross section of the chain and of its guiding means, Figs. 9 to 12 show different alternative arrangements for suspending of the trough of the ship elevator on the float, and Fig. 13 is a schematic top view of parts of a panel sluice gate using the arrangement according to this invention.

Referring to Figs. 1, 2 and 3 there is shown a trough 1 provided on both ends with removable gates 19, said trough being partly filled with water. This trough may accommodate the ship, which enters the trough from one end in one of the extreme positions of the trough after a tight connection between a water basin and the trough has been established and the gate 19 has been removed together with the corresponding gate of the basin. The trough 1 is supported by four cross beams 2. Water tight cylindrical floats 3 having a horizontal axis are firmly connected to the extremities of each pair of cross beams 2. These floats 3 are vertically movable in massive shaft-like chambers 4 arranged symmetrically along both sides of the trough 1 and filled with water from the upper water basin. The lifting power of the cylindrical floats 3 balances the weight of the trough filled with water, including the ship to be raised or lowered, and the additional structural elements which take part on the movement. Guidings 5 are provided in the shafts 4 for the moving trough and incorporate commonly used safety devices to prevent any sudden movement of the trough in case of leakage of a float or in case of any other equipment failure. These safety devices are not part of this invention and are therefore not described in detail. The shafts 4 are interconnected by channels not shown on the drawing which maintain a water level in all shafts which is equal to that of the upper basin.

Each shaft 4 is provided with two longitudinal slots 6 permitting passage of the beams 2, which are narrowed at the place of passage. The slots 6 are each covered by an endless chain 7 to prevent leakage of water from the shafts 4. Each beam 2 is connected to one link of a chain 7 which thus takes part in all movements of the trough 1. The chain 7 is guided at the top and at the bottom by guiding drums 8, 9 located in chambers 10 and 11 respectively (see also Fig. 4). As one link of the endless chain is connected to the beam 2 and one run of the chain covers the slot 6, the other run of the chain must either return through an opening of the beam 2 as shown in Figs. 1 and 3 or it may be guided in the shaft 4 around the float 3, so that the endless chain 7 surrounds the float, or at the outside on the remote side of the shaft 4, passing at the bottom through a special channel.

The individual links or elements 12, 13 of the chain 7 (see Figs. 6, 7, 8) are connected by bolts 14 each carrying a pair of rollers 15 bearing against guiding ledges 16 arranged along the slots 6. Each link 12, 13 carries a plate 17 which covers the slot 6. The individual plates 17 are in close contact and may be either provided individually with elastic means preventing leakage of water or a wide elastic band 20 of rubber or the like may be used to close all chain elements and to close the gap between the chain 7 and the ledges 16 or the wall of the shaft 4. To ensure correct positioning of the band 20, which would be stretched when passing together with the chain over the guiding drums 8, 9, the band 20 is guided over separate guiding drums 21' (see Fig. 5). The band is pressed by water pressure against the elements which form the gaps. There may be provided additional lateral packing elements for a tighter seal of the slot 6. The plates 17 may be arranged only on the active links of the chain 7 i.e. on links which actively contribute to the prevention of leakage between the inside and outside of the shaft 4.

When the trough 1 is raised or lowered, the chain 7 with the elastic band 20 is taken along, whereby the elements of one run of the chain 7 pass along the inside of the shaft 4, while the elements of the other run of the chain 7 are outside the shaft 4. The chain 7 is passed from the inside to the outside of the shaft 4 through a narrow channel 18 communicating with the chamber 11 (see Fig. 4).

The mode of operation of the ship elevator of the invention is substantially the same as that of similar ship elevators of this type. If the trough 1 with the ship is to be lowered from an upper basin to a lower one, the gate 19 which had been opened to admit the ship to the trough 1 is closed, and an amount of water is added to the trough to increase the weight of the trough, thereby causing slow sinking of the floats 3 in the shafts 4. The slot 6 is covered during this movement by the chain 7 and the elastic band 20 which take part in the movement of, the trough. Similarly, the trough is raised by removing an amount of water from the trough 1, so that the trough is lifted by the lifting power of the floats 3. The water losses caused thereby are negligible.

According to the arrangement shown in Figs. 1 to 3, the cross beams 2 are directly connected to the bodies of the cylindrical floats in a horizontal plane passing through the cylinder axis.

Figure 9:
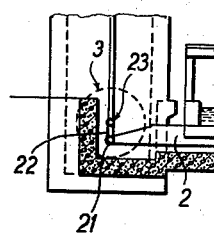
Figure 10:
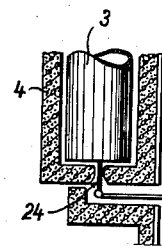

In the embodiment illustration Figs. 9 and 10, the cross beams 2 are linked to the floats 3 by means of pivot joints 21, 23, suspension rods 22, and axially arranged horizontal supporting brackets 24. The slots 6 in the shaft 4 are arranged here parallel to the longitudinal axis of the trough 1.

According to Figs. 11 and 12, the cross beams 2 are linked to cylindrical floats 3 having a vertical axis by means of joints 21, 23, suspension rods 22, and supporting brackets 24. The bracket 24 passes through laterally arranged slots 6 of the shafts in a manner similar to that shown in Figs. 9 and 10.

It will be understood that the supporting bracket 24 could be arranged also perpendicularly to the longitudinal axis of the trough 1.

The shafts 4 may be of reinforced concrete or of prestressed concrete. It is of course also possible to build them of steel. In any case, the slots 6 do not extend over the full height of the shafts 4, but only over the distance required for passage of the cross beams 2 so that the stress on the walls of the shaft is considerably reduced. For a better guiding of the floats 3 inside the shafts 4 guiding rollers 25 may be provided (Figs. 11 and 12).

Fig. 13 schematically shows a top view of a part of a heavy panel sluice gate in accordance with this invention. The sluice gate 26 is supported by beams 27 on floats 3 which are movable in shafts 4 in a way similar to that described in connection with the ship elevators of Figs. 1–12. The shaft 4 is provided with a slot 6 for the passage of the supporting beam 27 which is covered by an endless chain and an elastic band. As the slot 6 in this case may be substantially narrower than in the ship elevators, sealing of the slot is easier. The raising and lowering of the gate 26 may be accomplished by admitting water to the shaft 4 and by removing it therefrom.

The elevator arrangement of the invention requires neither bulky, high steel structures nor deep and costly excavations. The entire elevator for ships or the like may be held within reasonable dimensions matching the natural surroundings and saving considerable expense.

What I claim is:

1. An arrangement for raising and lowering heavy bodies comprising a support adapted to engage under a heavy body and having laterally extending beams, vertical shafts disposed at opposite sides of said support at the locations of said beams, each shaft having a vertical slot in a side thereof opening from the interior of said shaft, a float movable vertically in said shaft, connecting means extending through said slot from said float to one of said beams so that said support moves vertically with said float, an endless chain on said shaft, means guiding said chain to move along a path having at least one vertical run disposed along said slot, said endless chain including a series of pivotally interconnected links carrying plates which are closely adjacent each other during movement along said vertical run substantially to close said slot, and elastic means movable with said chain and sealing any gaps between said plates, and between the latter and a surface of the shaft to prevent leakage of water through said slot, one of said links of said chain being secured to said connecting means between the float in the shaft and the adjacent beam so that the chains and elastic sealing means are displaced along the slots of the related shafts in response to vertical movement of said support with the floats.

2. An arrangement as in claim 1; wherein each shaft has ledges extending along the opposite sides of said slot, and each link of the chain has rollers thereon riding on said ledges during movement of the related links along said vertical run; and wherein said chain has a vertical return run located outside of said shaft and passing through an opening in said connecting means between the related float and beam, and said shaft has a chamber through which said chain passes between said vertical run extending along the slot and said return run.

3. An arrangement as in claim 1; wherein each shaft has an additional vertical slot opposed to said first-mentioned slot, and said connecting means includes members projecting from the float in each shaft through said opposed slots and generally vertically disposed suspension links pivotally connected to said members and said beams to permit limited lateral displacement of said beams and support with respect to said floats.

4. An arrangement as in claim 3; wherein each chain has a vertical return run outside of the related shaft and said shaft has a narrow channel at the bottom thereof through which the chain passes between its vertical run along the related slot and its return run; and wherein said connecting means has an opening therein through which said return run passes.

5. An arrangement as in claim 1; wherein said elastic sealing means includes an endless elastic belt for each chain having a width greater than that of said plates and interposed between the latter and the inner surface of the shaft along the related slot, and separate guiding means for said endless belt.

6. An arrangement as in claim 1; further comprising rollers on said floats engaging the interior surfaces of said shafts for guiding the vertical movements of the floats in the shaft.

References Cited in the file of this patent

UNITED STATES PATENTS

| 710,170 | Weindorf | Sept. 30, 1902 |
| 1,941,183 | Nordin | Dec. 26, 1933 |

FOREIGN PATENTS

| 3,927 | Great Britain | 1868 |
| 831,825 | Germany | Feb. 18, 1952 |